United States Patent [19]
Jejina

[11] 4,121,047
[45] Oct. 17, 1978

[54] CIRCUIT ARRANGEMENT FOR THE SWITCHING ON AND OFF OF A TELEPRINTER PBX EXCHANGE

[75] Inventor: Filip Jejina, Puchheim, Fed. Rep. of Germany

[73] Assignee: Siemens Aktiengesellschaft, Munich, Fed. Rep. of Germany

[21] Appl. No.: 817,260

[22] Filed: Jul. 20, 1977

[30] Foreign Application Priority Data
Aug. 5, 1976 [DE] Fed. Rep. of Germany ....... 2635305

[51] Int. Cl.² .......................................... H04L 15/00
[52] U.S. Cl. .................................................... 178/3

[58] Field of Search ................... 178/2 R, 3, 69 G; 179/1 SW, 18 F, 18 H, 18 HA

*Primary Examiner*—Thomas A. Robinson
*Attorney, Agent, or Firm*—Schuyler, Birch, Swindler, McKie & Beckett

[57] ABSTRACT

A PBX exchange for teleprinters in which certain protected lines have the facility of direct connection to the main connection lines of the network, when the PBX exchange breaks down. Impermissible connections are avoided during the interruption and during the connection of the PBX exchange to the system by a circuit arrangement responsive to the respective switch on and switch off signals signalling corresponding operations of the exchange.

3 Claims, 2 Drawing Figures

CIRCUIT ARRANGEMENT FOR THE SWITCHING ON AND OFF OF A TELEPRINTER PBX EXCHANGE

BACKGROUND OF THE INVENTION

The invention relates to a circuit arrangement for teleprinter PBX exchanges, in which a switch-over device serves to connect at least a part of the PBX lines directly to the main connection lines of the network when the PBX exchange is switched off, and serves to reconnect the main connection lines and the PBX lines separately and to the PBX exchange when the said PBX exchange is switched on, this in order to prevent impermissible connections occurring during the switching off and on of the PBX exchange.

As is known, the use of a teleprinter PBX exchange offers the possibility of providing a relatively large number of subscriber stations with access to the switching network via a comparatively smaller number of exchange lines. Normally each connection establishment and each exchange of data takes place via the PBX exchange. If the PBX exchange breaks down, the PBX subscribers no longer have the possibility of establishing connections, receiving data or transmitting data. For this reason, it has already been proposed to lead at least a few of the PBX lines across a switch-over device within the PBX exchange, in which device, in the event of the breakdown of the PBX exchange, these PBX lines are directly connected to the lines of the network, which in the following will be referred to as main connection lines. Therefore, even in the event of the breakdown of the PBX exchange, these links, which are referred to as protected PBX lines, possess access via the main connection lines to a superordinate exchange, via which they can both establish connections and themselves be reached. When the PBX exchange is ready for operation again and thus, for example, the disturbance has been eliminated, the connection of the protected PBX lines to the main connection lines is discontinued and all connections again run across the PBX exchange. However, this gives rise to problems inasmuch as with every switch-over, i.e., each time the protected PBX lines are connected to the main connection lines and each time this connection is cut off, there is no assurance that all the lines will be in the rest state. This can lead to the establishment of impermissible connections following a switch-over via the lines connected to the PBX exchange.

SUMMARY OF THE INVENTION

The aim of the invention is to prevent impermissible connections being formed, when in the event of the breakdown of the PBX exchange the main connection lines connected to the PBX exchange and the PBX lines are directly connected to one another, and when, on the reconnection of the PBX exchange, these connections are broken and separately connected to the PBX exchange.

In accordance with the invention, this is achieved in that two time-dependent switching devices are provided for the evaluation of the switch-off and switch-on signals which characterize the switching off and switching on respectively of the PBX exchange. The first switching device which can be switched on by the switch-off signal switches on a switch circuit which is assigned to each transmitting device of the PBX exchange, and via which the transmitting devices can be connected to start polarity for a period of time determined by the first switching device. The second switching device which can be switched on by the switch-on and switch-off signal is assigned first and second control switching means. Via the first control switching means the switching means in the switch-over device can be caused to directly connect the wires of the PBX lines to the wires of the main connection lines, or to separately connect these lines to the PBX exchange. Via the second control switching means a further switching means in the switch-over device can be controlled, which in each case connects start polarity to the wires running in the direction of reception, for a period of time determined by the second switching device, in each case prior to a switch-over of the main connection lines and the PBX lines.

In an embodiment of the invention, the first and second time evaluating switching devices are each in the form of a monostable trigger circuit, whose control input is in each case connected to that input of the PBX exchange which emits the switch-on and switch-off signal, via a first gate arrangement and via delaying switching means, in such manner that the switch-off signal reverses the first and second monostable trigger circuits, whereas the switch-on reverses only the first monostable trigger circuit. The outputs of the second monostable trigger circuit are connected via a second gate arrangement to the two control switching means in such manner that following a reversal by the switch-on signal, firstly the second control switching means is switched on and, following the expiration of the period of time determined by the time constant of the second monostable trigger circuit, the first control switching means is switched on and the second control switching means is switched off. In contrast, following a reversal by the switch-off signal, firstly the second control switching means is switched on, a holding circuit is formed for the first control switching means, and following the expiration of the period of time both the first and the second control switching means are switched off.

The realization corresponding to the invention provides the advantage that both on the switching off and the switching on of the PBX exchange, and thus both in the event of the interconnection of and also of the separation of the main connection lines with the protected PBX lines, in each case prior to the actual switch-over process a centrally formed clearing criterion is available, and that thus all lines are brought into the determinate rest state irrespectively of whether a connection existed or not.

BRIEF DESCRIPTION OF THE DRAWINGS

Further details of the invention will be given in the following, making reference to an exemplary embodiment illustrated in FIGS. 1 and 2, in which.

DETAILED DESCRIPTION OF THE DRAWINGS

Figure 1:
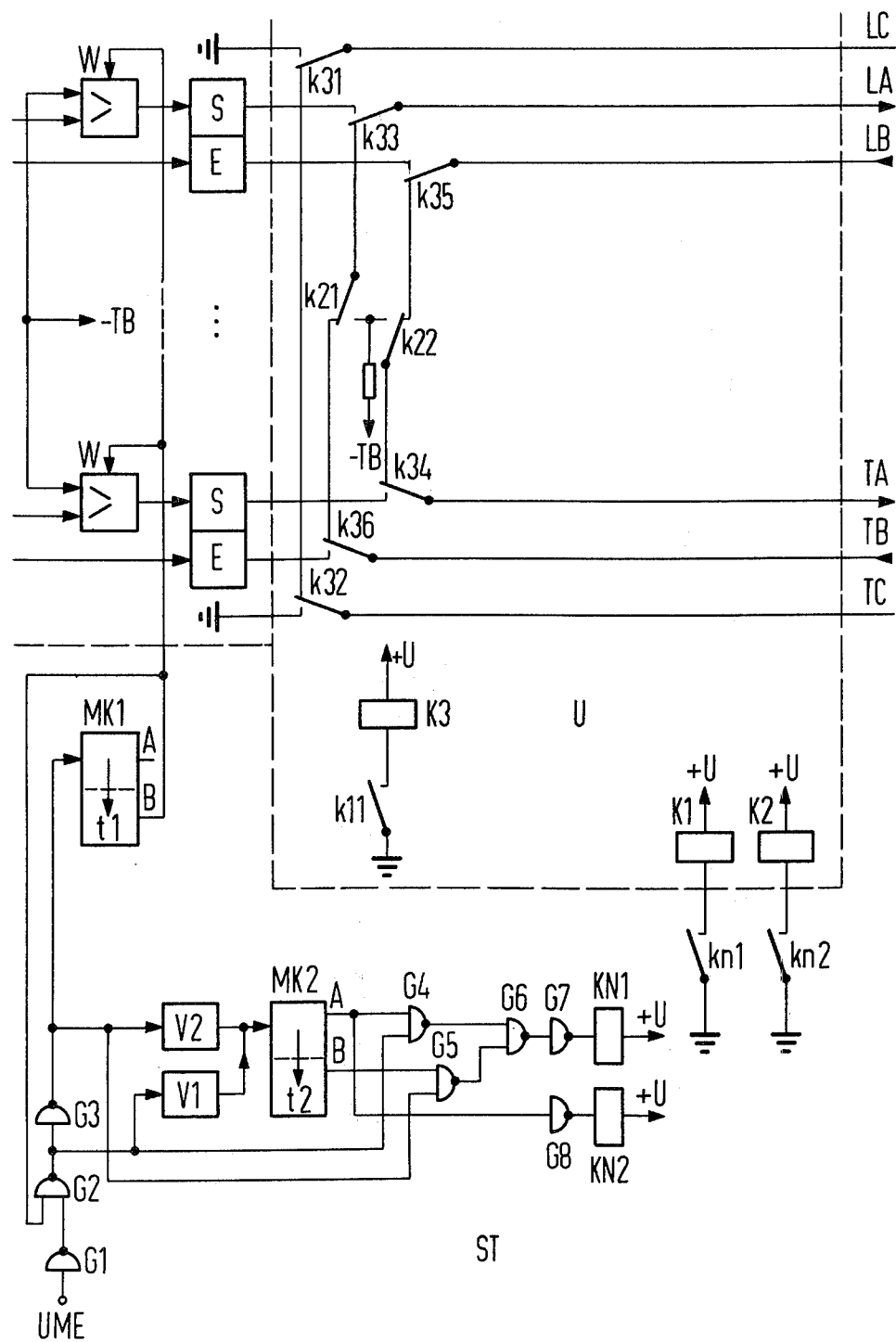
FIG. 1 illustrates an arrangement, with the aid of which the switching off and on of the PBX exchange and the clearance of all existing connections which takes place prior to each switch-over process, will be described.

FIG. 1 illustrates those parts, necessary for the explanation of the invention, of a teleprinter PBX exchange, to which the main connection lines comprising the wires LA, LB, and LC and the PBX lines comprising the wires TA, TB and TC are connected. The PBX lines are protected PBX lines, which in the event of the breakdown of the PBX exchange are directly connected to the main connection lines, by-passing the PBX exchange. This connection is carried out in the switchover device U via contacts $k31$ to $k36$ of a relay K3. Via these contacts $k31$ to $k36$, the wires TA, TB and TC of the PBX lines can be connected either to the transmitting and receiving devices S, E of the PBX exchange, or directly to the wires LA, LB and LC of the main connection lines.

The relay K3 is controlled by the evaluation of a switch-on and switch-off signal UM, which is available at the input UME of a control component ST, and which characterizes the switching on and switching off of the PBX exchange. In accordance with the invention, the signal UM is analyzed in such a way that both on the switching on and the switching off of the PBX exchange, all the existing connections are always cleared prior to a switch-over, so that no impermissible connections can be formed. For this purpose the control component ST contains two time-evaluating switching means, which in the exemplary embodiment consist of two monostable trigger stages MK1 and MK2, and of two control switching means, for example, two control relays KN1 and KN2.

The first monostable trigger stage MK1 is operated via a first gate arrangement comprising the gates G1, G2 and G3; two delaying switching means V1 and V2 are provided for the operation of the second monostable trigger stage MK2. The monostable trigger stages MK1 and MK2 are connected to the input UME of the control component ST via the gate arrangement G1, G2 and G3, and via the switching means V1 and V2 in such a way that on the occurrence of the switch-on signal UM=0, only the second monostable trigger stage MK2 is switched over, whereas on the occurrence of the switch-off signal UM=1, both monostable trigger stages MK1 and MK2 are switched over.

The control relays KN1 and KN2 which are connected to the second monostable trigger stage MK2 via a further gate arrangement comprising the gates G4, G5, G6, G7 and G8 here are controlled in such a way that prior to the switching on of the PBX exchange, start polarity is always connected to all the main connection lines and to all the PBX lines.

To enable a determinate clearing criterion to be connected to all the lines connected to the PBX exchange, prior to the switching off of the PBX exchange, the transmitting and receiving devices S and E of the PBX exchange are each assigned switch circuits W, which are switched over via the monostable trigger stage MK1, which is connected as a result of the evaluation of the switch-over signal UM=1, and which subsequently connect the transmitting devices S to start polarity.

In the following, the mode of operation of the arrangement illustrated in FIG. 1 will be described in detail. Here it has been assumed that the PBX exchange is switched off. This state is characterized by the switch-off signal UM=1 at the input UME. It has been further assumed that the two monostable trigger stages MK1 and MK2 are each triggered by logic 0 at their control input, and that their stable state is in each case characterized by logic 0 at the output A and by logic 1 at the output B. The logic potentials 0 and 1 may correspond, as in the conventional manner, to 0 volts and +5 volts.

When the PBX exchange is in the switched off state and those processes associated with the previous switching off have been concluded, both monostable trigger stages MK1 and MK2 occupy their stable state. Thus a 1 is in each case available at the output of the gates G7 and G8, and the two control relays KN1 and KN2 are switched off. Via the output B of the monostable trigger stage MK1, the control signal for the switch circuit W is also switched off (B=1). As a result of the blocked gates G7 and G8, the control relays KN1 and KN2 in the control component ST are switched off, and via the open contacts $kn1$ and $kn2$, the relays K1 and K2 in the switch-over device U are also switched off. Via the non-actuated contact $k11$ the relay K3 in the switch-over device U is also switched off. The contacts $k31$ to $k36$, like the contacts $k21$ and $k22$ occupy the illustrated position. This means that the wires TA, TB and TC of the PBX lines are directly connected to the wires LA, LB and LC of the main connection lines. During this state, the PBX subscribers can establish connections directly via the network and the superordinate exchange, by-passing the PBX exchange.

When the PBX exchange is ready for operation, and thus, e.g., is reconnected following a disturbance, the switch-on signal UM=0 occurs at the input UME of the control device ST. Via the gates G1 and G2 of the first gate arrangement, and via the switching means V1 and V2, the monostable trigger circuit MK2 is reversed by a 0 at the trigger input. Via the gate G3 and the switching means V2, the second monostable trigger circuit MK2 is prepared by the 1, which has been switched through undelayed, and is reversed by the 0, which has been switched through with delay via the switching means V1.

In this situation the first monostable trigger stage MK1 is not reversed, as its trigger input is connected via the gate G3 to 1. The 1 which appears at the output A of the monostable trigger stage MK2 leads, via the gate G8, to the switching on of the control relay KN2, whereas the control relay KN1 remains unenergized. Via the contact $kn2$, the relay K2 in the switch-over device U is energized. Via the contacts $k21$ and $k22$ of said relay, on the one hand the direct connection between the wires TA and TB of the PBX lines and the wires LA and LB of the main connection lines is broken and on the other hand start polarity −TB is connected in the transmitting direction. As a result of the reception of start polarity, any connections in existence in the superordinate exchange and in the subscriber devices are cleared.

The duration of the transmission of start polarity here is determined by the triggering time $t2$ of the monostable trigger circuit MK2, which in a practical example corresponding to the CCITT recommendation amounts to 1500 ms. On the expiration of the duration $t2$, the monostable trigger stage MK2 returns to its stable state, as a result of which the control relay KN2 drops out, and the transmission of start polarity is disconnected. Via the gates G5, G6 and G7, the control relay KN1 is now switched on; via the contact $kn1$ of which the relay K1 in the switchover device U is energized. The contact $k11$ of said relay closes a response circuit for the relay K3, via the contacts k31 to k36 of which, which have thus been actuated, all the wires LA, LB and LC of the main connection lines and all the wires TA, TB and TC of the PBX lines are connected to the PBX exchange.

Here the contacts k31 and k32 in each case connect through the ground wires LC and TC; the contacts k33 and k34 in each case connect through the receiving wires LA and TA to the transmitting devices S; and, the contacts k35 and k36 each connect through the transmitting wires LB, TB to the receiving devices E of the PBX exchange. As already described, this connection never occurs until start polarity has been connected to all lines, so that any connections in existence have been cleared prior to such a connection.

If a disturbance occurs within the PBX exchange, which necessitates a switching off, the signal UM at the input UME changes again from 0 to 1. Via the gate arrangement G1, G2 and G3, and via the switching means V1 and V2, both monostable trigger stages MK1 and MK2 are thus reversed by a 0 at their trigger input. The reversal of the second monostable trigger stage MK2 is in this case brought about via the switching means V2, via which the 0 passes with delay to the trigger input. At the output B of the first monostable trigger stage MK1, a signal is emitted which leads to the switching-over of the switch circuits W, and thus to the connection of start polarity to all the transmitting devices S of the PBX exchange.

The control relay KN2 is also switched on via the monostable trigger stage MK2, reversed by the switch-off signal UM=1, whereas a holding circuit exists for the control relay KN1 via the gate G4. As a result, the relay K3 remains energized in the switch-over device U, and via its contacts k31 to k36 the wires TA, TB, TC and LA, LB, LC remain connected to the transmitting and receiving devices S and E of the PBX exchange.

The start polarity which is connected via the switch circuits W thus passes, even before a switch-over, both to the superordinate exchange and also to all the connected subscriber stations, and leads to a compulsory clearance of any connections in existence. Not until after the expiration of the time t2, set by the time constant of the second monostable trigger circuit MK2, does the latter return to its stable state, as a result of which the control relay KN1, and, via the latter's contact kn1, also the relay K1 are switched off in the switch-over device U. In this way the energizing circuit for the relay K3 is also cut off, and the contacts k31 to k36 return to the illustrated position.

The wires TA, TB and TC of the PBX lines are now directly connected to the wires LA, LB and LC of the main connection lines, by-passing the PBX exchange, since following the expiration of the time t2 the control relay KN2 and thus also the relay K2 in the switch-over device have been switched off. Following the expiration of the time t1 set by the time constant of the first monostable trigger circuit MK1, the latter also returns to its stable position, which leads to the switching over of the switch circuits W, and thus to the disconnection of the start polarity at the input of the transmitting devices S in the PBX exchange.

During the time t1, via the gate G1 a blocking criterion is formed which prevents an indeterminate, renewed switch-over. Not until the end of the switch-off processes which have been described, is another change in the signal UM evaluated.

The connection, provided in accordance with the invention, of a polarity, which has been agreed to represent a clearing criterion, for a specific period of time in each case prior to the final switching on or off of the PBX exchange, serves not only to safely clear existing connections and thus to prevent the occurrence of impermissible connections. Also, in the event that subscribers are connected, they are provided with an analyzable criterion regarding the switching-off from the PBX exchange, as the arrival therein of start polarity during a determinate period of time leads to the sweep-through of the teleprinter and to the connection of the print lock.

As start polarity is in each case connected prior to the switching off of the PBX exchange via the transmitting devices of the PBX exchange, it is transmitted not only across the main connection lines and the protected PBX lines, but is also transmitted via the so-called unprotected PBX lines. Also on these lines, any connections existing are safely cleared prior to the switching off of the PBX exchange.

Figure 2:
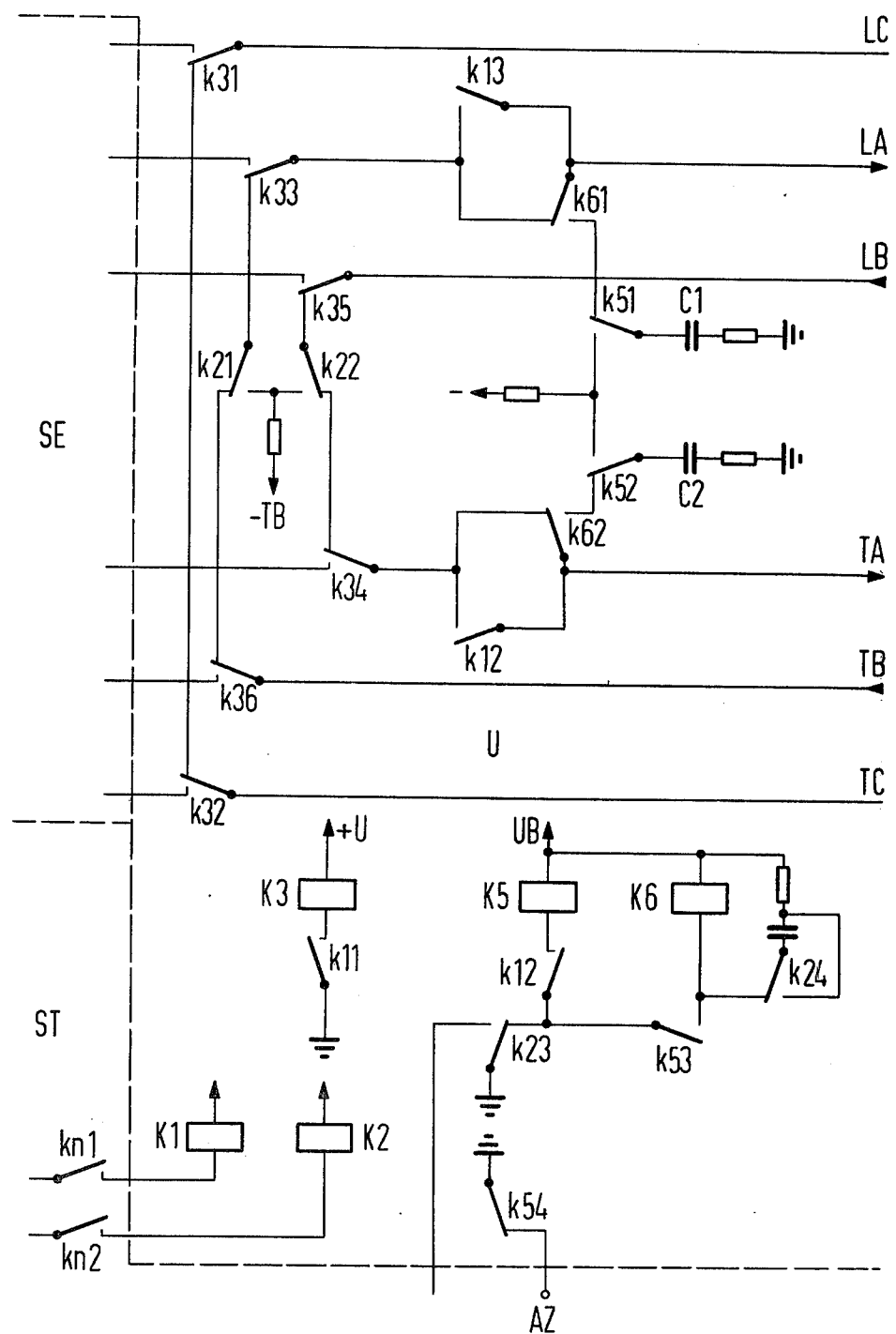
FIG. 2 shows a further embodiment of the invention, with reference to which the clearance of all existing connections will be described in the event in which the voltage supply in the PBX exchange breaks down.

In the event of a voltage failure, it is not always ensured that the switch-off signal will exhibit the value agreed to characterize the switch off. In order to ensure a reliable clearance of existing connections, prior to the final switch-off, also under these circumstances, in an embodiment of the invention, in the switch-over device U there are provided further switching means, which can likewise be switched on by the control component ST. An exemplary embodiment illustrated in FIG. 2 contains merely the switch-over device U, as the other devices are constructed as described with reference to FIG. 1.

In addition to the relay K3 illustrated in FIG. 1, the switch-over device U contains two further relays K5 and K6. Here the relay K5 is arranged in a circuit which is connected to the operating voltage UB. The relay K6 is designed with a drop delay, which drop delay preferably corresponds to the period of time t2 formed by the time constant of the second monostable trigger stage. In addition to the contacts k31 to k36, which serve to connect the wires LA, LB and LC of the main connection lines and the wires TA, TB and TC of the PBX lines to one another, or to the PBX exchange, here the relevant receiving wire LA, TA in each case contains a contact k61 and k62 of the relay K6, via which the relevant receiving wires are cut off on the reversal of the relay K6. At the same time, with the contacts k51 and k52, the negative charge stored in the two capacitors C1 and C2 are connected to the wires LA and TA, and transmitted, as start-polarity pulse, to the superordinate exchange and to the connected subscriber devices. If the devices connected by the lines contain telegraph relays, this start-polarity pulse in each case produces the start-polarity position of the relay, so that the start-polarity pulse can be analyzed as clearing signal.

The contacts k12 and k23, arranged in the response circuit of the monitoring relay K5, of the relays K1 and K2 which can be controlled via the control component ST in known manner, ensure that the monitoring relay K5 acts as operating voltage monitor only when the PBX exchange is switched on. This also facilitates the formation, via a further contact k54, of a display criterion AZ indicating the switched-on or switched-off state of the PBX exchange.

I claim:

1. Circuit arrangement for teleprinter PBX exchanges, in which a switch-over device connects at least a part of the PBX lines directly to the main connection lines upon the switching off of the PBX exchange, and reconnects the PBX lines and the main connection lines both separately and to the PBX exchange on the switching on of the PBX exchange, in order to prevent impermissible connections occurring during the switching off and the switching on of the PBX exchange, the improvement comprising two time-dependent switching devices (MK1, MK2) provided for the analysis of switch-off and switch-on signals (UM=0, UM=1) which respectively characterize the switching off and switching on of the PBX exchange;

said first switching device (MK1) being operable to be switched on by the switch-off signal (UM=0) and operable to switch on a switch circuit (W) which is assigned to each transmitting device (S) of the PBX exchange;

said switch circuit being operable to connect the transmitting devices (S) to start polarity for a period of time (t1) determined by the first switching device (MK1);

said second switching device (MK2) being operable to be switched on by the switch-on and the switch-off signals (UM=0, UM=1) and having assigned thereto first and second control switching means (KN1, KN2), a switch-over device (U) having first switching means (K1, K3) connected to said first control switching means to directly connect the wires (TA, TB, TC) of the PBX lines to the wires (LA, LB, LC) of the main connection lines, or to separately connect these lines to the PBX exchange; and second switching means (K2) which is arranged in the switchover device (U) and is operable to be controlled by the second control switching means (KN2) to connect start polarity (−TB) to the wires (LA, TA) leading in the direction of reception for a period of time (t2) determined by the second switching device (MK2), in each case prior to the switchover of the main connection lines and the PBX lines.

2. Circuit arrangement as claimed in claim 1 in which the first and second time-evaluating switching device each consists of a monostable trigger circuit (MK1, MK2), whose control input is in each case connected to the input (UME, which provides the switch-on and switch-off signal (UM=0, UM=1) via a first gate arrangement (G1, G2, G3) and via delaying switching means (V1, V2), in such manner that the switch-off signal (UM=1) reverses the first and second monostable trigger circuits (MK1, MK2), whereas the switch-on signal (UM=0) reverses only the second monostable trigger stage (MK2); that the outputs of the second monostable trigger circuit (MK2) are connected via a second gate arrangement (G4 to G8) to the two control switching manes (KN1, KN2) in such manner that following a reversal by the switch-on signal (UM=0) firstly the second control switching means (KN2) is switched on and only after the expiration of the period of time (t2) determined by the time constant of the second monostable trigger circuit (MK2) is the first control switching means (KN1) switched on and the second control switching means (KN2) switched off again, whereas following a reversal by the switch-off signal (UM=1), firstly the second control switching means (KN2) is switched on, a holding circuit is formed for the first control switching means (KN1), and following the expiration of the period of time (t2) both the first and the second control switching means (KN1, KN2) are disconnected.

3. Circuit arrangement as claimed in claim 2 in which the switch-over device (U) includes a monitoring relay (K5) which can be energized via the operating voltage (UB), and a drop-delayed relay (K6) which is connected via a contact (k51) of the monitoring relay (K5), and via the contacts (k61, k62) of which all the receiving wires (LA, TA) which are connected to the PBX exchange can be broken, that a pulse store (C1, C2) is provided, which, when the monitoring relay (K5) drops, can be connected to all the receiving wires (LA, TA) via contacts (k51, k52) of the monitoring relay (K5) and via the contacts (k61, k62) which serve to break the receiving wires (LA, TA) of the drop-delayed relay (K6).

* * * * *